Sept. 3, 1957 G. M. BOOTH 2,804,778
VARIABLE DRIVING MECHANISM
Filed Aug. 26, 1952 2 Sheets-Sheet 1

INVENTOR
George M. Booth
BY Robert S. Dunham
ATTORNEY

Sept. 3, 1957          G. M. BOOTH          2,804,778

VARIABLE DRIVING MECHANISM

Filed Aug. 26, 1952          2 Sheets-Sheet 2

INVENTOR
George M. Booth
BY Robert S. Dunham
ATTORNEY

United States Patent Office 2,804,778
Patented Sept. 3, 1957

2,804,778

VARIABLE DRIVING MECHANISM

George M. Booth, Westfield, N. J., assignor to Wallace & Tiernan Company, Inc., Newark, N. J., a corporation of New York Application August 26, 1952, Serial No. 306,477

8 Claims. (Cl. 74—125.5)

The present invention relates to variable driving mechanism for moving a load at an average speed which is continuously variable over a wide range.

Many variable ratio drive mechanisms have been constructed in which the speed of an output shaft is variable over a wide range while the speed of an input shaft remains constant. In such prior art mechanisms, the output shaft rotates continuously at all speed settings. The problem of providing a continuously variable output shaft speed with a fixed input shaft speed is mechanically very difficult, and the prior art devices have typically been either very complex or they have included mechanical elements which required close dimensional tolerances. In either case, the construction and maintenance costs have been excessive.

Some loads, requiring operation at variable speeds, also require that the shaft driving them be continuously rotated. Many such loads which are presently driven with continuously rotating shafts may, however, be successfully operated with an intermittent drive, providing the average speed of rotation of the shaft is continuously variable over a wide range. Among the loads which may be successfully operated with an intermittent drive are feeding mechanisms for many chemical and industrial processes. For example, a device for feeding dry material, such as shown in the co-pending application of John S. Ballard, Ser. No. 284,993, filed April 29, 1952, now Patent No. 2,765,899, may be successfully operated by an intermittent drive for most of its applications.

An object of the present invention is to provide a variable intermittent drive mechanism which is simple, compact, rugged and easy to construct and maintain.

Another object is to provide a variable driving mechanism for driving an output shaft intermittently, and which is adjustable to vary the average speed of the rotation of the output shaft accurately and continuously over a wide range.

Another object is to provide a variable driving mechanism including a clutch which is engaged and disengaged for predetermined complementary proportions of a repeated operating cycle.

Another object is to provide, in such a mechanism, improved means for varying said proportions of the cycle to vary the average output shaft speed.

A further object is to provide an improved mechanism for intermittently operating a clutch.

A further object is to provide improved combined clutch and brake mechanism, by which the output shaft is braked when the clutch connecting it to the input shaft is disengaged.

A further object is to provide an improved mechanism for producing intermittent reciprocation from continuous rotation.

The foregoing and other objects of the invention are attained in the apparatus described herein, which includes a driving shaft supported for continuous rotation and for limited axial movement. One end of the shaft carries a follower mechanism which cooperates with a stationary cam mechanism. This cam mechanism includes two cylindrical cams having end faces which cooperate with a pair of diametrically opposite roller followers mounted on a yoke which is pivoted to the driving shaft. The cams have complementary projections and recesses on their working faces. If the roller at one side only of the yoke is engaging a projection, the shaft remains in a first axial position or range of positions. However, if the rollers on both ends of the yoke engage projections simultaneously, the shaft is moved endwise from said first position to a second position spaced from said first position or range of positions. A clutch is connected to the driving shaft, and is movable to connect or disconnect the driving shaft from a driven shaft. One of said first and second positions corresponds to the driving condition of the clutch and the other of said first and second positions corresponds to the non-driving condition of the clutch. One of the two concentric cams is fixed and the other is angularly adjustable so that the proportion of the cam assembly periphery having diametrically opposed projections effective to engage the diametrically opposite followers and hold the shaft endwise in the second position may be adjusted by shifting the adjustable cam, either manually or otherwise. The effect of the cam and follower mechanism is to hold the shaft in its respective positional relationships for predetermined complementary proportions of a repeated operating cycle, the proportions being determined by the position of the adjustable cam and the cycle being repeated with rotation of the shaft.

The clutch mechanism includes a clutch member carried by the driving shaft and a cooperating clutch member carried on a driven shaft. In the preferred modification, the driven shaft is concentric with, rotatable on and axially movable with respect to the driving shaft. Means are provided to limit the axial movement of the driven shaft including a movable stop member rotatable and axially movable with the driven shaft and a stationary stop member located in the path of axial movement of the movable stop member. When the stationary stop member is engaged by movable stop member during the axial movement of the driving shaft, the continued axial movement of the driving shaft is effective to separate the two clutch members. The stop members then act as a brake frictionally arresting the rotation of the driven shaft. A spring biases the two clutch members into engagement. This spring also cooperates at times with the stop members to bias them into engagement, and is then also effective to bias the followers into engagement with the cam mechanism.

Other objects and advantages of the present invention will become apparent from a consideration of the following specification, taken together with the accompanying claims and drawings, in which:

*Figs. 1–4*

Figure 1:
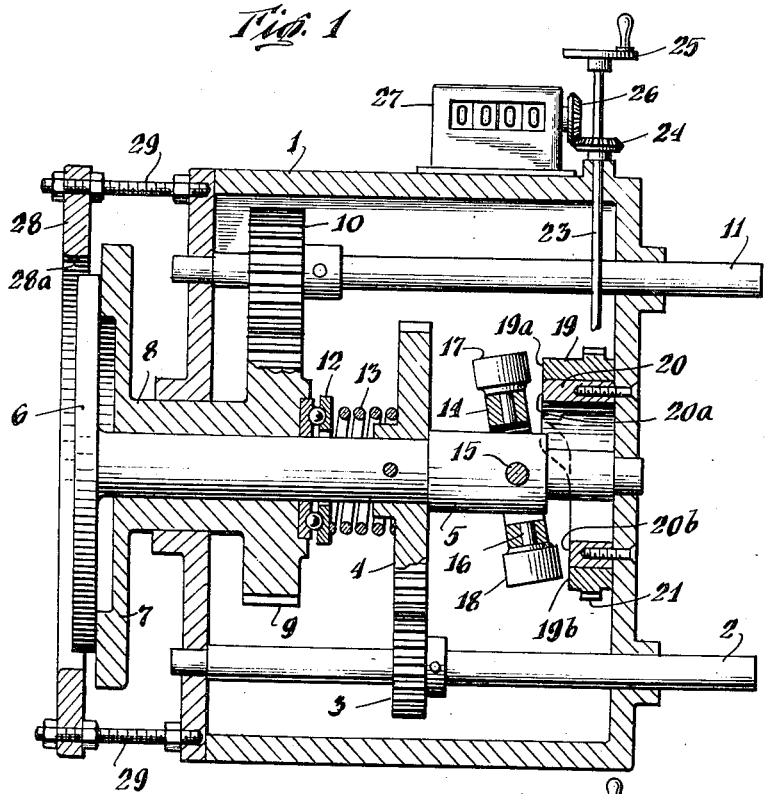
Fig. 1 is a sectional view of a variable drive mechanism embodying the invention.

Referring to the drawings, there is shown a casing 1, which may be filled with oil. Journalled in the casing 1 is an input shaft 2 on which is fixed a gear 3. The gear 3 meshes with a gear 4 fixed on a shaft 5, hereinafter termed the driving shaft. A clutch plate 6 is mounted on the left hand end of shaft 5, as viewed in the drawings. The clutch plate 6 cooperates with a driven clutch plate 7 mounted on a driven shaft 8, which is hollow and concentric with the shaft 5, and rotatably and slidably mounted on the shaft 5 and journalled in the casing 1. The driven shaft 8 has fixed thereon a gear 9 which meshes with a gear 10 fixed on an output shaft 11 journalled in the casing 1.

The end of driven shaft 8 opposite the clutch plate 7 carries a bearing 12. A spring 13 is retained in compression between the bearing 12 and the gear 4 and biases the driving and driven shafts for relative movement in a sense to hold the clutch plates 6 and 7 in engagement.

The clutch members 6 and 7 are intermittently engaged and disengaged by reciprocation of the driving shaft 5. This reciprocation of shaft 5 is produced by an improved mechanism for producing reciprocation from continuous rotation, which mechanism appears at the right hand side of Figs. 1 and 2.

The right hand end of shaft 5 is journalled in a wall of the casing 1. Within the casing 1 and spaced from the right hand end, the shaft 5 carries a follower mechanism including a yoke 14 mounted on a pivot pin 15 which extends perpendicularly to the axis of shaft 5. The yoke 14 carries diametrically opposite, outwardly projecting pins 16, perpendicular to the pivot pin 15. Follower rollers 17 and 18 are journalled on the pins 16.

The rollers 17 and 18 cooperate as followers with a pair of concentric adjacent cylindrical cams 19 and 20. The cams 19 and 20 have complementary projections 19a and 20a and recesses 19b and 20b. The inner cam 20 is fixed to the casing 1. The outer cam 19 is angularly adjustable with respect to the cam 20. For the purpose of adjustment, the cam 19 is provided on its outer periphery with a worm gear 21 which cooperates with a worm 22 fixed on a shaft 23. Shaft 23 extends outside the casing 1. A bevel gear 24 and a hand wheel 25 are fixed on the shaft 23 outside the casing 1. The bevel gear 24 cooperates with another bevel gear 26 to drive a register mechanism 27. The roller followers 17 and 18 are wider than the cams 19 and 20, and the followers overlap both cams. Consequently, if a portion of a projection on one cam is radially adjacent a portion of a recess on the other, the projection, rather than the recess, determines the axial positions of the followers as they become radially aligned with those adjacent cam portions.

The clutch plate 7 has a larger diameter than the clutch plate 6. A stop plate 28 is mounted on one end of the casing 1 by means of studs 29. The stop plate 28 has an aperture 28a which is larger in diameter than clutch plate 6, but smaller in diameter than the clutch plate 7.

*Operation—Figs. 1–4*

When the parts are in the positions shown in Fig. 1, the clutch plates 6 and 7 are held in engagement by the spring 13. The clutch plate 7 is spaced from the stop plate 28. In the particular angular position of the rollers 17 with respect to cams 19 and 20 which is shown in Fig. 1, the assembly including the shafts 5 and 8, yoke 16 and rollers 17 is free to float between a position in which both the rollers 17 and 18 engage the cams 19 and 20, and a position in which the clutch plate 7 engages the stop plate 28. As long as that assembly floats freely between those two positions, the input shaft 2 remains in driving connection with the output shaft 8 through the clutch 6, 7. If the floating assembly moves over to a position where the clutch plate 7 engages stop plate 28, there will be no tendency for the clutch plates to separate, since the spring 13 is still effective to hold them together. Furthermore, there will then be no substantial friction between the clutch plate 7 and the stop plate 28 since there is substantially no force holding those surfaces together.

If the floating assembly moves to the right, its movement in that direction is stopped only when the roller 17 engages projections 19a and 20a, and roller 18 engages recesses 19b and 20b. However, such engagement of the cams and rollers has no effect on the engagement or disengagement of the clutch, nor does it apply any substantial frictional load to shaft 5.

The clutch members 6 and 7 are disengaged only when the diametrically opposite followers 17 and 18 move into engagement with diametrically opposite portions of the projections 19a and 20a. In the normal operating condition of the mechanism of Figs. 1 to 4, the cams 19 and 20 are positioned angularly relative to each other so that at least portions of the projections are diametrically opposite. When the followers 17 and 18 engage those diametrically opposite portions of the projection, the yoke 16, the pivot pin 15 and the shaft 5 are shifted bodily to the left from the positions shown in Fig. 1 to the positions shown in Fig. 2. During this movement, the periphery of clutch plate 7 engages stop plate 28, thereby stopping the driven clutch plate 7 from following clutch plate 6 so that the clutch plates are separated. This engagement of the stop plate 28 by the periphery of clutch plate 7 is effective not only to separate the clutch plates 6 and 7, but also the friction between the stop plate 28 and the clutch plate 7 has a braking effect on that clutch plate, so that the output shaft 11 and its load are stopped from rotating substantially immediately as soon as the clutch is released by simultaneous engagement of the rollers 17 and 18 with the cam projections.

In this position of the parts, spring 13 is effective to hold the periphery of clutch plate 7 in engagement with the stop plate 28, and is also effective to hold the followers 17 and 18 in engagement with the cams 19 and 20.

On each of the cams 19 and 20, the projection extends through 180° of the periphery and the recess extends through the remaining 180°. With this arrangement, the cam 19 may be adjusted relative to the cam 20 from one extreme position shown in Fig. 3A, wherein the projections of the two cams are diametrically opposite each other, to an opposite extreme position shown in Fig. 3B, wherein the projections are aligned with each other. A half-way position is illustrated in Fig. 3C, wherein the projections of the two cams are offset by 90°.

Figure 2:
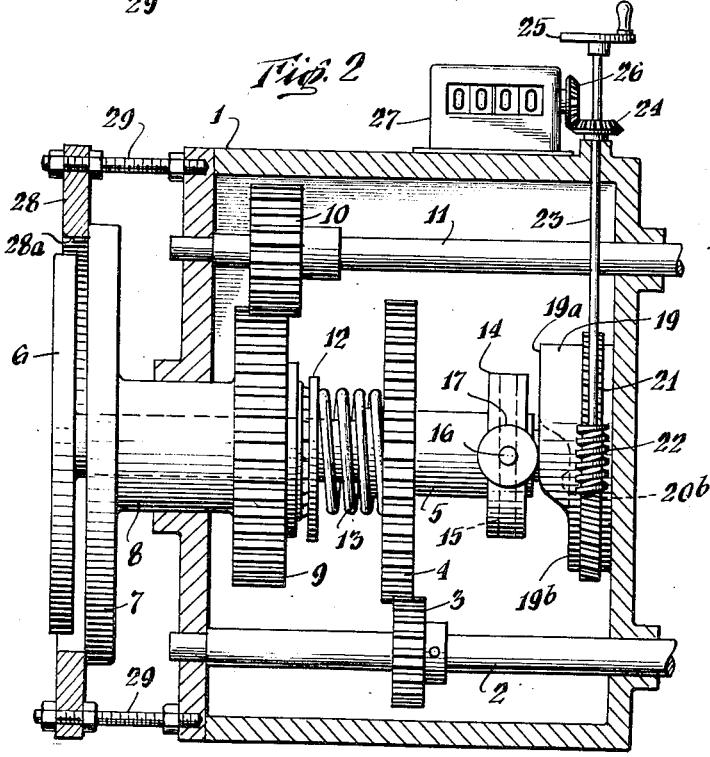
Fig. 2 is an elevational view of the internal parts of the mechanism of Fig. 1, showing the parts in a different operating position.
Figure 3:
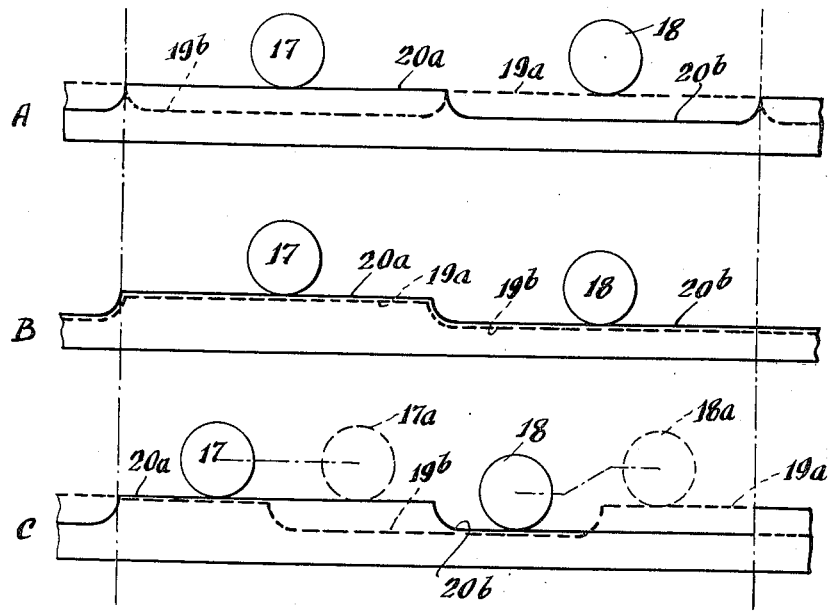
Fig. 3 is a developed view of the cam surfaces and the followers, showing diagrammatically the positional relationship of the follower rollers to the cam surfaces under various operating conditions.

When the two cams are in the relative positions shown in Fig. 3A, both rollers 17 and 18 are always engaging a cam projection, so that as the driving shaft 5 rotates, it is continuously maintained in the axial position shown in Fig. 2, wherein the clutch plates 6 and 7 are separated and the output shaft is not driven.

When the cam 19 is shifted to the position shown in Fig. 3B, then if the rollers were of negligibly small diameter, one of the two rollers would always be engaging a recess, so that the driving shaft 5 would remain in the position shown in Fig. 1, the clutch plates 6 and 7 would remain in engagement, and the output shaft 11 would be continuously driven. However, since the rollers are necessarily of a finite diameter, the output shaft is continuously driven except at the transition points where both rollers are passing the end of a projection.

When the cam 19 is adjusted to the position shown in Fig. 3C, the rollers 17 and 18 are operated in a repeated time sequence such that the clutch is operated in a cycle including a period during which both rollers engage projections and the clutch is disengaged followed by a complementary period during which one roller engages a recess and the clutch is engaged. If the rollers 17 and 18 start in the positions shown in solid lines in Fig. 3C and move to the positions shown at 17a and 18a in dotted lines, it may be seen that the right hand roller 18 will remain in a recess until it reaches the leading edge of the projection 19a. When it moves up on the projection 19a, both rollers will be on projections, since the left hand roller 17 remains on the projection 20a. This condition continues for 90° of rotation of the shaft, until the left hand roller 17 passes off the end of projection of 20a. The left hand roller 17 remains in the recesses for another 90° of rotation of the shaft, at which time it, in turn, is lifted by the projection 19a. With this arrangement, it may be seen that the clutch plates 6 and 7 remain engaged for 90° of rotation of the drive shaft 5 and then are disengaged for 90° of rotation of that shaft. This cycle is repeated each half-revolution as long as the drive shaft rotates.

Figure 4:
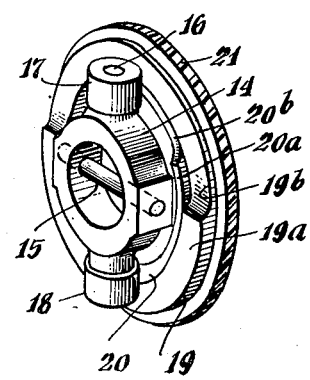
Fig. 4 is an angular projection of the cam and follower mechanism.

The proportional relationship between the complementary periods of clutch engagement and disengagement may be varied by adjustment of the angular position of cam 19. Fig. 4 shows the cams in a position where the cam 19 has been offset by an angle less than 90° from the position of the inner cam 20. It will be readily understood that by shifting the outer cam 19 with respect to the inner cam 20, the magnitudes of the angles in each half-revolution of the driving shaft through which both rollers 17 and 18 remain continuously engaged with projections may be varied from 0°, as shown in Fig. 3B, through 90°, as shown in Fig. 3C, to 180°, as shown in Fig. 3A. Consequently, for a given fixed speed of the input shaft 2, the average speed of the output shaft 11 may be varied from zero to a maximum value determined by the ratios between the gears 3, 4 and 9, 10. For any multiple of half-revolutions of the driving shaft 5, the output shaft 11 may be accurately driven through a corresponding number of angular increments whose proportion with respect to the driving shaft half-revolutions is determined by the setting of the hand wheel 25. The register 27 may be conveniently arranged to read the percentage of output revolutions to input revolutions, (taking into account the gear ratio between the input and output shafts).

Although the cam adjusting mechanism is illustrated as being operated by a hand wheel 25, it will be readily recognized that any other suitable operating device may be substituted, including various types of automatic control.

The cam contours may be varied from those illustrated as determined by the requirements of any particular installation. For example, the projection of one cam may be made shorter than 180°, while the projection of the other cam is made equal to 180°. With such an arrangement, it would be impossible to adjust the cams so as to secure continuous rotation of the output shaft. Alternatively, the projection on one cam could be made longer than 180°, while the projection on the other cam is made equal to 180°. With such an arrangement, the cams could not be adjusted so that the output shaft would remain stationary.

Another possible alternative would be to make one cam projection angularly greater than 180°, and the other cam shorter than the complementary angle required to complete the full circle. The output shaft would then have a minimum average speed greater than zero and a maximum average speed less than continuous rotation. In this way, any desired limits could be applied to the rage of proportions of the input shaft speed at which the output shaft is operated.

The braking arrangement illustrated might be modified in several respects. The rotating braking surface need not be on the periphery of the clutch plate 7, as illustrated, but may be on any part which rotates and moves axially with the driven shaft 8. If desired, a non-braking stop arrangement could be used for limiting the axial movement of the driven shaft 8 instead of the braking stop arrangement shown. Such a non-braking stop would be used with a load which tends to brake itself.

The floating arrangement of the shafts 5 and 8, as described above, reduces the wear on the cams and rollers, since those parts are loaded only when both rollers 17 and 18 are engaging projections on the cams. If the floating action is undesirable for any reason, another biasing spring can be provided, for example, between the left hand side of casing 1 and the gear 9, so as to hold the rollers 17 and 18 continuously in engagement with the cams.

Figure 5:
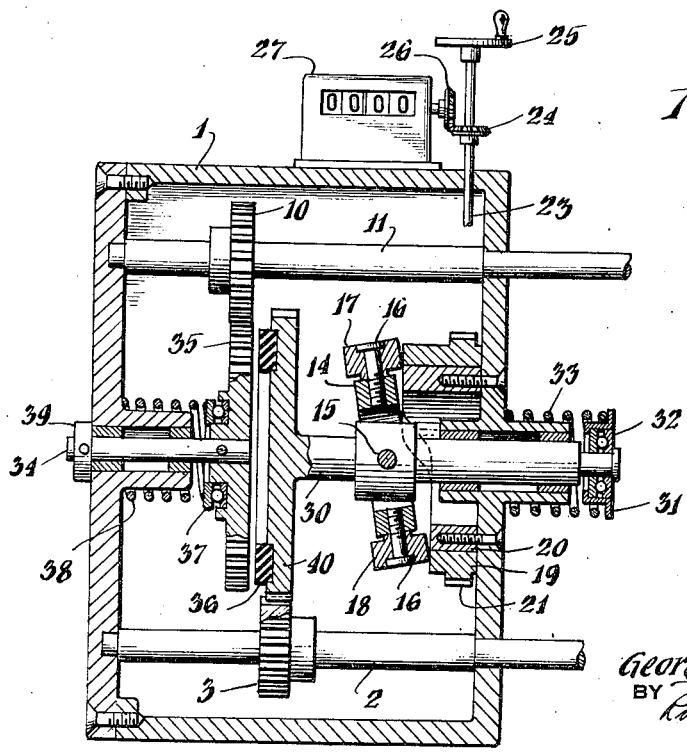
Fig. 5 is a sectional view similar to Fig. 1 illustrating a modified form of variable drive mechanism embodying certain features of the invention.

*Fig. 5*

This figure illustrates a modified form of variable driving apparatus embodying the invention, in which the clutch is engaged when both rollers 17 and 18 are riding on cam projections, rather than being disengaged at that time as in the construction shown in Figs. 1 to 4. In this modification, the driving shaft is axially biased continuously so that the rollers 17 and 18 always ride on the surfaces of the cams 19 and 20.

In Fig. 5, those parts which correspond in structure and in function to their counterparts in Figs. 1 to 4 have been given the same reference numerals as those counterparts and will not be further described.

In Fig. 5, the gear 3 drives a gear 40 fixed on a driving shaft 30 which is journalled in the right hand side of the casing 1. The driving shaft 30 corresponds generally to the driving shaft 5 of Fig. 1, and supports the yoke 14 by means of the pivot pin 15 in a similar manner.

Outside the casing 1, the end of shaft 30 rotatably supports a spring retainer 31 by means of a bearing 32. A compression spring 33 is held between the retainer 31 and the right hand side of casing 1. The spring 33 biases the shaft 30 to the right, so that the rollers 17 and 18 are continuously held in engagement with the cams 19 and 20.

The driven shaft 34 is aligned with the driving shaft 30 and is journalled in the left hand side of the casing 1. On its right hand end, the shaft 34 carries a gear 35 which meshes with the gear 10 on the output shaft 11. The right hand face of gear 35 serves as one plate of a clutch, the other face being formed by a clutch facing ring 36 attached to the left hand side of gear 40. Near its hub, the gear 35 carries on its left hand side a bearing 37. A spring 38 is retained in compression between bearing 37 and the left hand wall of casing 1. The left hand end of shaft 34 carries a stop flange 39. As shaft 34 is moved to the right by spring 38, flange 39 engages the left hand wall of casing 1 and limits that movement.

The operation of the mechanism shown in Fig. 5 corresponds generally to that shown in Figs. 1 to 4, with certain exceptions including those noted above, namely, that the clutch is engaged when the rollers 17 and 18 are both engaging cam projections, and that the rollers 17 and 18 are continuously biased into engagement with the cams 19 and 20. Another difference in the operation is that there is substantially no braking action between the flange 39 and the left hand side of the casing 1.

The mechanism shown in Fig. 5 has been successfully used to drive a counter-weight along the lead screw of a scale beam. The apparatus shown in Figs. 1 to 4 has been used to drive a dry feeder of the type illustrated in the co-pending application of John S. Ballard, Ser. No. 284,993, previously mentioned. It is, therefore, apparent that the present invention is capable of application to a wide range of loads, and that it is not limited to any particular field of use.

It is to be understood that the invention is not limited to the specific apparatus herein shown and described, but may be embodied in other forms without departure from its spirit.

I claim:

1. Variable driving mechanism including a driving shaft, means supporting said shaft for continuous rotation and for limited axial movement between first and second positions, a driven shaft, concentric with said driving shaft and rotatably and slidably mounted on said driving shaft, means operable to connect said driving and driven shafts and including a first clutch member connected to the driving shaft for rotation and axial movement therewith, and a second clutch member cooperating with said first clutch member and connected to the driven shaft for rotation therewith, spaced flanges on said driving and driven shafts, respectively, a spring retained in compression between said flanges and biasing said shafts for relative movement in a direction to engage said clutch members, cam and follower means operatively connected to said driving shaft to move it axially in a direction from its first position to its second position, stop means to limit the movement of the driven shaft in said direction and thereby to cause disengagement of the clutch members as the driving shaft moves to its second position, said spring being effective when the clutch members are disengaged to bias said driving shaft in the direction toward said first position.

2. Variable driving mechanism including a driving shaft, a driven shaft, means operable to connect said driving and driven shafts and including a first clutch member connected to the driving shaft for rotation and axial movement therewith and a second clutch member cooperating with said first clutch member and connected to the driven shaft for rotation therewith, means supporting both the shafts for rotation and for axial movement, a stationary cam device, a follower device mounted on the driving shaft, means effective upon rotation of the driving shaft to move the first clutch member axially through a limited stroke between a first position and a second position, means limiting the axial movement of said second clutch member so that it is disengaged by the first said clutch member when the latter is in its second position, said follower device comprising a yoke pivoted on said driving shaft for movement about a pivot axis perpendicular to the shaft axis, and a pair of diametrically opposite cam followers on said yoke; said cam device comprising a pair of adjacent cylindrical cams concentric with said driving shaft axis and having end cam surfaces facing and aligned with said followers and cooperating therewith, each said cam surface having complementary projections and recesses and being narrower than said followers, so that when a portion of the projection of one cam is radially adjacent a portion of the recess of the other cam, the axial position of a follower is determined by said projection portion; means settable to adjust the effective cam contour to vary the proportion of each rotation of the driving shaft during which the driving shaft is in said second position, said settable means including means operable to shift one of said cams angularly with respect to the other to vary the proportion of the total cam periphery occupied by diametrically opposite projections; and means to bias said driving shaft for movement axially in a direction to engage said followers and said cam surfaces, said biasing means being effective at least until said driving shaft has moved in said direction a substantial distance beyond the axial position which it occupies when both said diametrically opposite followers are engaging diametrically opposite projections, said last-mentioned axial position corresponding to one of said first and second positions, and the position to which said driving shaft is biased by said biasing means corresponding to the other of said positions, said cam device, said follower device and said biasing means cooperating to move said driving shaft to its first and second positions at separated times defining complementary proportions of a repeated operating cycle, said proportions being determined by the relative angular positions of said cams and the repetition of said cycle being determined by the revolutions of the driving shaft.

3. In variable driving mechanism, apparatus for producing intermittent reciprocation from rotation, comprising a cam device and a follower device, said devices being mounted on a common fixed axis for rotation of one device relative to the other and for axial reciprocation of one device relative to the other, said follower device comprising a support, a yoke pivoted on said support for movement about a pivot axis perpendicularly intersecting said fixed axis, and a pair of cam followers on said yoke and located on diametrically opposite sides of said fixed axis; said cam device comprising cylindrical cam means concentric with said fixed axis, said cam means having contoured end surface portions facing and radially aligned with both said followers and cooperating therewith, said contoured surface portions having projections and recesses, biasing means connected and arranged to bias one of said devices against the other in a first position when both said diametrically opposite followers are engaging diametrically opposite projections, said biasing means being effective when one of said followers is adjacent to one of said recesses to shift said last-mentioned one of the devices away from said first position and toward a second position wherein said one follower is received in said recess, means for relatively rotating said devices, and means to adjust at least one of said projections angularly about said axis with respect to another projection, so as to vary the proportion of each relative rotation of said devices during which said last-mentioned one of said devices occupies said first position.

4. Variable driving mechanism as defined in claim 3, including means to render said biasing means ineffective before the reciprocable device reaches a position in which said one of said followers engages the bottom of a recess, so that said followers and said yoke are loaded substantially only when both followers are engaging projections.

5. Variable driving mechanism as defined in claim 3, in which said cam means comprises a pair of adjacent concentric cylindrical cams, each having a contoured end surface, said surface being narrower than said followers, so that when a portion of a projection of one cam is radially adjacent a portion of a recess of the other cam, the position of a follower aligned with said radially adjacent portions is determined by said projection portion, and means operable to adjust one of said cams angularly relative to the other, to vary the proportion of the cam periphery occupied by diametrically opposite projections, so that said reciprocable device occupies said first and second positions for predetermined complementary proportions of a repeated operating cycle, said proportions being determined by said adjusting means and the repetition of the cycle being determined by the rotation of said rotatable device.

6. Cam and follower mechanism, comprising a pair of cams located side by side, each of said cams providing a path to be cyclically traversed and having portions along its path formed as projections and recesses, means for adjusting one cam in the direction of its path with respect to the other; a pair of cam followers, each follower overlapping and cooperating with both cams; means supporting said followers for engagement with portions of said cams spaced along said paths, said supporting means comprising a member movable relative to said cams between first and second positions, relatively movable means operatively connecting said member to said followers for movement of the followers relative to said member and toward and away from the cams, and biasing means acting on said member at least in its second position and in a direction to shift said member from said second position toward said first position; said cams, said followers and said supporting means cooperating to move said member to said first position whenever at least one follower is adjacent to recesses on both cams, and to hold said member in said second position when both followers engage projections on said cams, and means for cyclically relatively moving said supporting means and said cams to cause said followers to traverse said paths along the cams, said cams and followers being effective during said cyclic movement to move said member alternately between its first and second positions.

7. Cam and follower mechanism, comprising a pair of concentric cylindrical cams, each having an active surface formed as projections and recesses, means for adjusting one cam rotatably with respect to the other; a pair of cam followers, each follower overlapping and cooperating with both cams; means supporting said followers for engagement with angularly spaced portions of said cams, said supporting means comprising a member movable relative to said cams between first and second positions, relatively movable means operatively connecting said member to said followers for movement of the followers relative to said member and toward and away from the cams, and biasing means acting on said member at least in its second position and in a direction to shift said member from said second position toward said first position, said cams, said followers and said supporting means cooperating to move said member to said first position whenever at least one follower is adjacent to recesses on both cams, and to hold said member in said second position when both followers engage projections on said cams, and means for relatively rotating the supporting means and the cams, said cams and followers being effective during such relative rotation to move said member alternately between its first and second positions.

8. Variable driving mechanism comprising a cam device, a follower device, said cam device comprising cam structure disposed circularly about a predetermined axis, providing an annular path for said follower device, facing in the direction of said axis and having portions respectively projecting and recessed in the direction parallel to said axis, said projecting and recessed portions respectively comprising a plurality of projecting segments and a plurality of recessed segments, means for adjusting said cam structure to displace at least one of said projecting segments angularly with respect to another of said projecting segments, one of said devices being rotatable about said axis, driving means including a shaft along said axis and connected to said rotatable device for rotating the same, said follower device comprising a plurality of follower members and means supporting said members at mutually circumferentially spaced localities around said circular path, said supporting means comprising means mounting the follower members to rock in unison about an axis extending crosswise of said first-mentioned axis, said cam structure having its projecting portion constructed and arranged so that through a part of the aforesaid annular path for the follower device, the follower members simultaneously engage said projecting portion and so that through another part of said path at least one follower member is in traversing relation with the recessed portion of said cam structure, one of said devices being shiftable along the first-mentioned axis relative to the other, means for biasing the shiftable device toward the other device when the follower members simultaneously engage the projecting portion of the cam structure, to maintain such engagement and to displace said shiftable device in a direction toward the other device in response to departure of one of the follower members from the projecting portion into the recessed portion, a shaft to be driven, a pair of clutch members having connection respectively to said driving means and said driven shaft, one of said clutch members being movable between a position of engagement with the other and a position of disengagement therefrom, said movable clutch member being connected with said shiftable device to be moved thereby between said positions, said follower and cam devices and said biasing means and said movable clutch member being mutually constructed and arranged to maintain said clutch member in one of its said positions during engagement of the follower members simultaneously with the projecting portion of the cam structure and to displace said clutch member to its other position when at least one of the follower members enters a recessed portion of the cam structure, for periodically connecting said driving means with said driven shaft through said clutch members to drive the last mentioned shaft during predetermined parts of successive rotations of the rotatable device, said cam structure adjusting means being effective to change the proportion of each rotation of the rotatable device during which the driving means and the driven shaft are connected.

References Cited in the file of this patent

UNITED STATES PATENTS

| | | |
|---|---|---|
| 210,940 | Kendall | Dec. 17, 1878 |
| 1,147,910 | Woerner | July 27, 1915 |
| 1,602,122 | Reed | Oct. 5, 1926 |
| 2,326,136 | Garrett | Aug. 10, 1943 |
| 2,328,542 | Bates | Sept. 7, 1943 |
| 2,356,167 | McKelvey | Aug. 22, 1944 |
| 2,484,471 | Shinn | Oct. 11, 1949 |
| 2,558,679 | Gressel et al. | June 26, 1951 |

FOREIGN PATENTS

| | | |
|---|---|---|
| 271,065 | Germany | Mar. 3, 1914 |
| 360,602 | Germany | Oct. 5, 1922 |